(12) United States Patent
Kuether et al.

(10) Patent No.: US 8,447,226 B1
(45) Date of Patent: May 21, 2013

(54) PORTABLE SATELLITE EARTH STATION AND METHODS OF USING THE SAME

(75) Inventors: David J. Kuether, Brea, CA (US); Rick Rosner, Marina del Rey, CA (US); Steven M. Schein, Riverside, CA (US); Joshua T. Morenstein, San Francisco, CA (US); Pichaya Puttorngul, San Francisco, CA (US); Naoya Edahiro, San Francisco, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 692 days.

(21) Appl. No.: 12/006,610

(22) Filed: Jan. 4, 2008

Related U.S. Application Data

(60) Provisional application No. 60/878,824, filed on Jan. 5, 2007.

(51) Int. Cl.
*H04M 1/00* (2006.01)

(52) U.S. Cl.
USPC ............... 455/3.02; 455/575.1; 455/575.2; 455/575.3; 455/575.4; 455/575.5; 455/575.6; 455/575.7

(58) Field of Classification Search
USPC ........................... 455/575.1–575.7
See application file for complete search history.

(56) References Cited

U.S. PATENT DOCUMENTS

| | | | |
|---|---|---|---|
| 4,710,778 A * | 12/1987 | Radov | 343/882 |
| 5,334,990 A | 8/1994 | Robinson | |
| 5,351,130 A | 9/1994 | Dugan et al. | |
| 5,404,583 A * | 4/1995 | Lalezari et al. | 455/90.3 |
| 5,416,730 A | 5/1995 | Lookofsky | |
| 5,463,261 A | 10/1995 | Skarda et al. | |
| 5,470,233 A | 11/1995 | Fruchterman et al. | |
| 5,477,263 A | 12/1995 | O'Callaghan et al. | |
| 5,510,778 A | 4/1996 | Krieter et al. | |
| 5,528,248 A | 6/1996 | Steiner et al. | |
| 5,533,123 A | 7/1996 | Force et al. | |
| 5,537,157 A | 7/1996 | Washino et al. | |

(Continued)

FOREIGN PATENT DOCUMENTS

| | | |
|---|---|---|
| JP | 63-245132 | 10/1988 |
| JP | 01-233924 | 9/1989 |

(Continued)

OTHER PUBLICATIONS

PRO Brand International, Inc.; "Eagle Aspen™ DBS To-Go" literature, Apr. 2007.

(Continued)

*Primary Examiner* — Bobbak Safaipour

(57) ABSTRACT

Various aspects of a portable satellite earth station to facilitate reception of satellite signals and to display audio and video corresponding to the satellite signals are described. According to one example, a portable satellite earth station includes a housing including a base hingably connected to an antenna containing portion, wherein the base includes a compartment; and a receiver/display configured to fit into the compartment in the housing, the receiver/display including a video display portion hingably connected to a receiver portion and movable between a folded position and an unfolded position, wherein the receiver/display may be moved to the unfolded position when the receiver/display is located in the compartment in the housing and the antenna containing portion can be closed into contact with the base over the receiver/display when the receiver/display is in the folded position.

46 Claims, 15 Drawing Sheets

U.S. PATENT DOCUMENTS

| | | | |
|---|---|---|---|
| 5,537,343 A * | 7/1996 | Kikinis et al. | 361/679.56 |
| 5,542,104 A | 7/1996 | Ozawa et al. | |
| 5,603,102 A | 2/1997 | Rebec et al. | |
| 5,915,020 A * | 6/1999 | Tilford et al. | 455/3.02 |
| 6,040,851 A | 3/2000 | Cheng et al. | |
| 6,272,317 B1 | 8/2001 | Houston et al. | |
| 6,336,030 B2 | 1/2002 | Houston et al. | |
| 6,339,707 B1 | 1/2002 | Wainfan et al. | |
| 6,424,796 B2 | 7/2002 | Flannery | |
| 6,459,388 B1 | 10/2002 | Baron | |
| 6,683,581 B2 | 1/2004 | Matz et al. | |
| 6,687,518 B1 | 2/2004 | Park | |
| 6,694,396 B1 | 2/2004 | Candelore et al. | |
| 6,708,029 B2 | 3/2004 | Wesel et al. | |
| 6,711,379 B1 | 3/2004 | Owa et al. | |
| 6,753,823 B2 | 6/2004 | Matz et al. | |
| 6,789,307 B1 | 9/2004 | Matz et al. | |
| 6,795,033 B2 | 9/2004 | Matz et al. | |
| 6,799,364 B2 | 10/2004 | Matz et al. | |
| 6,809,690 B2 | 10/2004 | Tao | |
| 6,889,421 B1 | 5/2005 | Matz et al. | |
| 6,906,673 B1 | 6/2005 | Matz et al. | |
| 6,937,188 B1 | 8/2005 | Saunders et al. | |
| 7,010,263 B1 | 3/2006 | Patsiokas | |
| 7,010,265 B2 | 3/2006 | Coffin, III | |
| 7,068,971 B2 | 6/2006 | Abutaleb et al. | |
| 7,102,580 B2 | 9/2006 | Matz et al. | |
| 7,634,300 B2 * | 12/2009 | Bliss | 455/575.1 |
| 2006/0075602 A1 * | 4/2006 | Oh | 16/297 |
| 2006/0135222 A1 * | 6/2006 | Kim | 455/575.1 |
| 2008/0026801 A1 * | 1/2008 | Bliss | 455/575.1 |

FOREIGN PATENT DOCUMENTS

| | | |
|---|---|---|
| JP | 04-357719 | 12/1992 |
| JP | 06-090196 | 3/1994 |
| JP | 06-188760 | 7/1994 |

OTHER PUBLICATIONS

Mobile Satellite Products Corporation; "LYNXX® Transportable Inmarsat-B" literature; reprinted from Satellite Communications; Feb. 1995; Argus, Inc.; Atlanta GA, U.S.A.

NEC Newscope; "ATM-To-The-Home Broadband Access" literature, Sep. 1995.

PCMCIA (Personal Computer Memory Card International Association); "Black Box Explains . . . " literature, Jan. 2001.

SatCom Electronics, Inc.; "SatCom PASSPort The Perfect Choice for Portable and Mobile Satellite Communications" literature, May 2000.

* cited by examiner

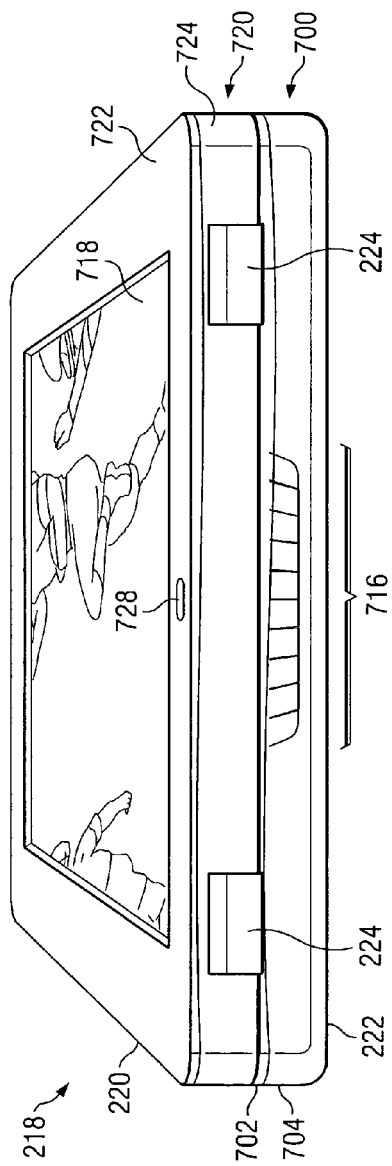
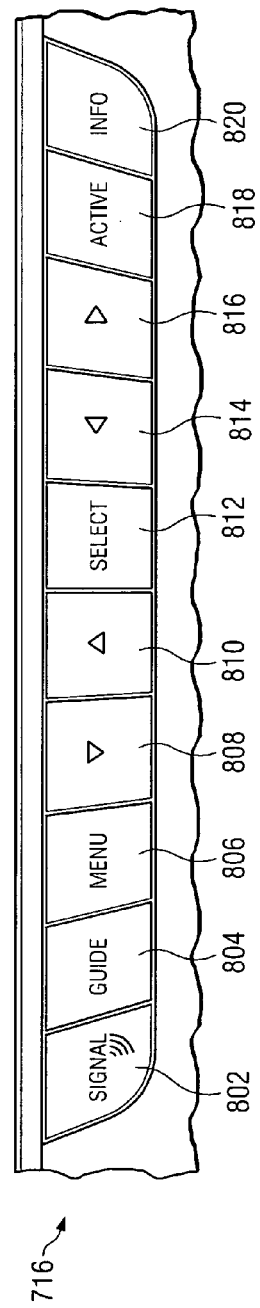
FIG. 7B
FIG. 8

| Picture | Picture Mode | Custom, Dynamic, Standard, Mild, Movie |
|---|---|---|
| | Custom Picture | Contrast |
| | | Brightness |
| | | Color |
| | | Sharpness |
| | | Tint |
| | Color Tone | Cool 1, Cool 2, Normal, Warm 1, Warm 2 |
| | Size | Normal, Zoom, Wide |
| Sound | Sound Mode | Standard, Music, Movie, Speech |
| Settings | Language | English, Español |
| | Closed Caption | Off, CC1, CC2, CC3, CC4, Text1, Text2, Text3, Text4 |
| | Backlight Brightness | Low, High |
| | Vehicle Battery | 12V / 24V (Default 12V) |
| Parental Controls | Change Password | New Password | |
| | | Confirm | |
| | Block | On, Off | |
| | MPAA Ratings | G, PG, PG-13, R, NC-17, X, View | |
| | TV Rating - Children | Age | TV-Y, TV-Y7, View |
| | | Fantasy Violence | TV-Y7, View |
| | TV Rating - General | Age | TV-G, TV-PG, TV-14, TV-MA, View |
| | | Dialogue | TV-PG, TV-14, View |
| | | Language | TV-PG, TV-14, TV-MA, View |
| | | Sex | TV-PG, TV-14, TV-MA, View |
| | | Violence | TV-PG, TV-14, TV-MA, View |
| | No rating programs | View, Block | |

*FIG. 16*

PORTABLE SATELLITE EARTH STATION AND METHODS OF USING THE SAME

CROSS REFERENCE TO RELATED APPLICATIONS

This application claims the benefit of U.S. Provisional Application No. 60/878,824, filed Jan. 5, 2007, the entirety of which is incorporated herein by reference. In addition, this description hereby expressly incorporates by reference the material contained in U.S. Pat. No. 5,915,020, which is owned by the assignee of this patent application.

BACKGROUND

Conventionally, satellite receiver stations employed in residential use include a receiver/decoder that is coupled to an antenna that is substantially permanently mounted in a fixed position. Most satellite receiver antennas are fastened to a rigid portion of a residence, such as a chimney, a portion of a roof, or a side wall. Thus, while the receiver/decoder may be moved throughout the residence, as long as it remains coupled to the antenna, the receiver/decoder may not be easily removed from the residence and used at an alternate location because the alternate location also requires an antenna that is properly oriented to receive the satellite signal.

However, in situations in which the antenna and the receiver/decoder are moved (e.g., removed from the residence in favor of installation at an alternate location), the receiver/decoder are not easily transportable owing to their intention to be disposed in a residence and, in the case of the antenna, substantially permanently fixed thereto. Additionally, conventionally an antenna includes a substantial arm on which satellite receiver components are disposed. The length of this arm makes it awkward to transport the antenna. Furthermore, even if the antenna and the receiver/decoder were moved, a user still needs a display device on which to view received satellite content. This entails the use of another component (e.g., a television) in addition to the receiver/decoder and the antenna. As with the antenna, televisions are not typically easily transportable as they are intended to be installed in substantially fixed, residential locations.

BRIEF DESCRIPTION OF THE DRAWINGS

FIG. 7B is a front view of the receiver/display portion of the portable satellite earth station when the receiver portion is folded.

FIG. 8 a drawing showing user interface controls that may be provided to control satellite receiver aspects of the portable satellite earth station.

FIG. 16 is a representation of a user interface arrangement that may be implemented on the portable satellite earth station.

DETAILED DESCRIPTION

Figure 1:
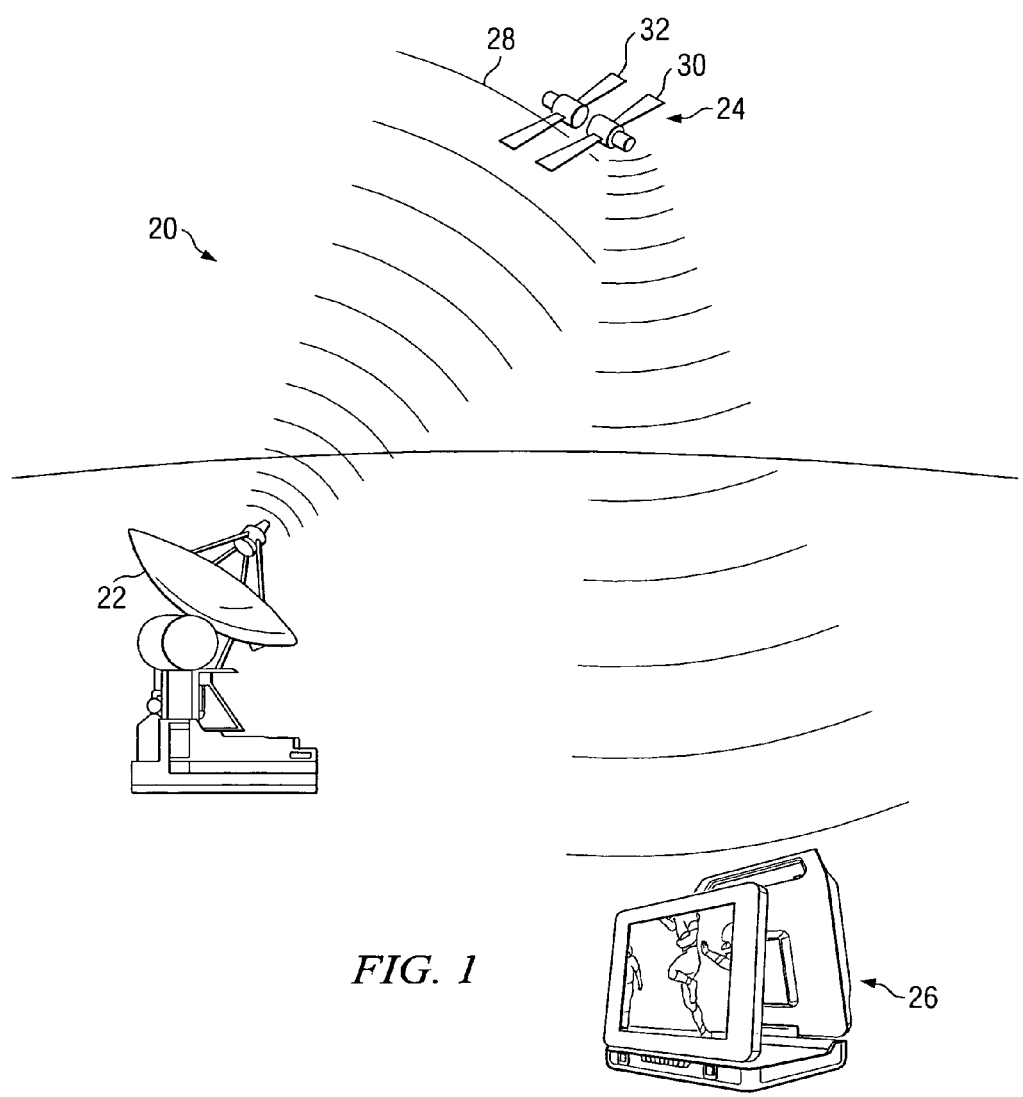
FIG. 1 is a diagram showing a satellite system incorporating the disclosed portable satellite earth station.

Although the following discloses example systems including, among other components, software or firmware executed on hardware, it should be noted that such systems are merely illustrative and should not be considered as limiting. For example, it is contemplated that any form of logic may be used to implement the systems or subsystems disclosed herein. Logic may include, for example, implementations that are made exclusively in dedicated hardware (e.g., circuits, transistors, logic gates, hard-coded processors, programmable array logic (PAL), application-specific integrated circuits (ASICs), etc.) exclusively in software, exclusively in firmware, or some combination of hardware, firmware, and/or software. Accordingly, while the following describes example systems, persons of ordinary skill in the art will readily appreciate that the examples are not the only way to implement such systems.

Portable satellite earth stations are described herein. The described portable satellite earth stations may be used at remote locations at which no terrestrial or cable television service is available, or may be used in place of such services. For example, the portable satellite earth station may be used to receive satellite programming at a campsite, a recreational vehicle park, a natural disaster site, an emergency site, etc. Additionally, the portable satellite earth station may be used to provide access to satellite programming at sporting events, such as football tailgate parties or the like.

Furthermore, the portable satellite earth station may be useful as residences such as apartments or condominiums, wherein hanging antennas outside the building is not allowed. In such instances, the portable satellite earth station may be placed inside the residence and the satellite signals may be received through a window, provided the window is sufficiently electrically transparent to allow the satellite signals to pass therethrough. In one example, a portable satellite earth station may be placed within a residence near a single glass pane window and may receive satellite signals through the glass. The received signals may then be processed to provide the programming content.

The satellite programming that is received, processed, and presented by the portable satellite earth station may include, but is not limited to, conventional television programming that is commonly available via cable, network, or satellite television sources. Of course, this may include situation comedy programs, sporting programs, news magazine programs, special interest programs, educational programs, etc.

Additionally, a satellite programming provider may include emergency or disaster recovery programming that may be received by the portable satellite earth station. Such programming fills a serious need in the United States emergency response system by providing the infrastructure to distribute critical information to areas affected by a disaster. A system for wirelessly distributing disaster information and other critical information to portable satellite earth stations that are not tethered by conventional infrastructure connections creates a wireless infrastructure to receive video feeds, and possibly other content, satellite, fiber, and/or Internet streaming from, for example, the National Hurricane Center, federal emergency management administration (FEMA), county and local emergency offices, and other agencies that dispense critical information.

For example, a satellite programming provider may include one or more channels of news programming or programming from other disaster-related sources. In one example, the satellite programming may include information provided by police and/or fire authorities from a state or local governmental level. Additionally, federal authorities, such as the federal bureau of investigation (FBI), the central intelligence agency (CIA), (FEMA) or other agencies, may provide programming content via the satellite provider. Such programming is usefully provided via a satellite link to an emergency area having damaged infrastructure, such as damaged transmitters, telephone lines, cable television and network lines, and the like. Using the portable satellite earth station described herein, emergency officials such as police and/or fire officials can be kept abreast of the emergency situation at a broader level than can be observed from a single location at the disaster site.

In one particular example, an emergency channel may be the main channel of an emergency network of channels. Such channels have relatively low-bandwidth and may only, but not necessarily so, operate during times of a significant emergency. At other times a fixed slate of programming is broadcast on the channels describing what viewers will find in case of an emergency.

To create such a system, critical federal, state, and local emergency-information outlets would be signed up, vetted, and coordinated to provide their programming.

To facilitate the distribution and reception of such emergency programming, a set of hardware and software would be designated as a "recommended emergency communications package." Emergency operations centers and weather offices would be encouraged to install the package of equipment so they can stream news conferences and other critical information. The package would include necessary computer hardware, which would possibly include a new Slingbox AV, to create the stream and, likely, a satellite system to maintain a connection to the Internet if and when terrestrial systems become non-functional. Fiber connections are often available from many of the offices where emergency information is distributed. If possible, these feeds would be used as the primary source for the video feeds with internet streaming used as the secondary source.

According to this particular example, whenever a disaster (natural or manmade) has occurred or is threatening the emergency network goes on the air. At this point various feeds are received at the broadcast center, such as the DIRECTV Broadcast Center, and assembled into the main emergency channel. The screen of the distributed content would likely have text and other graphics on the left side and the bottom making an "L." The video box in the upper right of the "L" is the most important feed coming in at any moment. Elsewhere in the "L" are a schedule of upcoming briefings and other text emergency information.

Additionally, a mosaic channel showing the various active feeds and the time of each agency's next update would be created so users could select the specific information for their particular area.

More than one emergency channel could be ready for broadcast. Multiple channels would be needed in a large-scale disaster or when more than one event was happening at the same time. The channel continues broadcasting until the emergency has passed and normal communications systems are functioning.

Some of the programming for the channel will come from already-distributed feeds from emergency officials. For example, the National Hurricane Center does briefings as often as every hour when a storm is threatening. Further, large counties and states now routinely hold news conferences updating the media and residents on the governments' response systems. This system brings these feeds together to an emergency network.

Some emergency management offices would distribute their information by text, in addition to or instead of video news conferences. In this case, full screens of text would be shown sequentially with critical information.

In addition, live cameras, satellite images, weather maps, forecast data, and other video and data feeds could be shown at times when a news conference video feed is not being broadcast live or on tape.

The system would be designed so the channel's operation could be initiated by the broadcast center operations staff. Additionally, an effort would be made to design the infrastructure so the channel(s) could be remotely directed and supervised. This would allow people with expertise in emergency communication to have a hand in coordinating the information. There is no intrinsic reason that controlling the feeds couldn't be handled from a remote location. The director of the channel would, ideally, have an understanding of the issues involved in the particular emergency.

Advantageously, all of the foregoing emergency programming may be received by portable satellite earth stations that may be personally owned, or deployed as part of a state, local, or federal emergency management response. Due to the terrestrially infrastructureless nature of the portable satellite earth station, which is light weight and portable, emergency information may be made available at any time in any place.

As described herein, in one example a portable satellite earth station includes a clam shell housing that, when folded, protects a receiver portion that is disposed within the clam shell housing including an antenna. In use, the receiver portion may be removed from the clam shell housing so that the housing and its integral antenna may be positioned to receive a satellite signal. Of course, it is contemplated that other mechanical configurations may be constructed. For example, youth and high end users may desire differently styled portable satellite earth stations, which may be provided in a number of different styles and colors.

As part of the positioning, a portion of the clam shell containing the antenna may be rotated and/or pivoted with respect to a remaining portion of the clam shell. For example, the portion of the clam shell containing the antenna may be pivoted in a manner similar to a notebook computer display (e.g., pivoted along an axis running generally parallel to the horizontal). Additionally, the antenna bearing portion of the clam shell may be rotated about an axis that is generally perpendicular to the pivot axis of the clam shell. In this manner, both elevation (e.g., the angle with respect to the horizontal) and azimuth (e.g., the angle with respect to a vertical plane) may be adjusted to enable a user to position the antenna for receipt of a satellite signal. A compass disposed within or on the clam shell may be used to assist a user in properly positioning the antenna within the clam shell for receipt of a satellite signal.

A power supply is provided to allow portable operation of the device. The device may also be powered by an alternating current (AC) power supply that is plugged into an AC wall outlet. Alternatively, the device may be powered by a DC adapter that may be plugged into, for example, a cigarette lighter of a vehicle. The power provided to the portable satellite earth station powers the various components necessary for receiving satellite signals. These components can include, for example, a satellite antenna, satellite receive electronics, a video decoder and a display monitor.

Referring now to the drawings, FIG. 1 illustrates a digital satellite system 20 including a ground-based uplink transmitter 22, a space segment 24 and a portable satellite earth station 26.

Ground-based transmitter 22 receives programming feed such as audio and/or video feeds and uplinks a digital signal 28 to one of satellites 30, 32 that form the space segment 24. In one example, the digital signals 28 are transmitted to the satellites 30, 32 at assigned carrier frequencies between, for example, 17.3 GHz and 17.8 GHz. For a direct broadcast satellite (DBS) system, the uplink 28 may include a plurality of 40 Mbps digital signal carriers having an analog bandwidth of 24 MHz. According to one particular example, adjacent carriers are transmitted with alternating left and right-hand circular polarization to allow frequency overlap of adjacent carriers to conserve available bandwidth. The 24 MHz bandwidth carriers may, therefore, be spaced with center frequencies only 16 MHz apart. The carriers may be quadrature-phase shift keyed (QPSK) modulated, with a symbol rate of 20 Megasymbols/sec, to provide a total bit rate of 40 Mbps.

The satellites 30, 32 receive and translate digital signal 28 to carrier frequencies between about 12.2 GHz and 12.7 GHz for downlink to earth stations. Ordinarily, satellites 30, 32 are geostationary satellites such as a Hughes®™ HS-601™ spacecraft positioned at a geostationary orbital location at approximately 101 degrees West longitude. In one particular example, satellites 30, 32 transmit the downlink signals via high-power 120 or 240 watt transponders (not shown) to enable DBS reception within the satellite's downlink footprint. The portable earth station 26 shown in FIG. 1 is located within the satellite's footprint receives the transmitted downlink signal. Further detail regarding example implementations of the portable satellite earth station are provided below.

Figure 3:
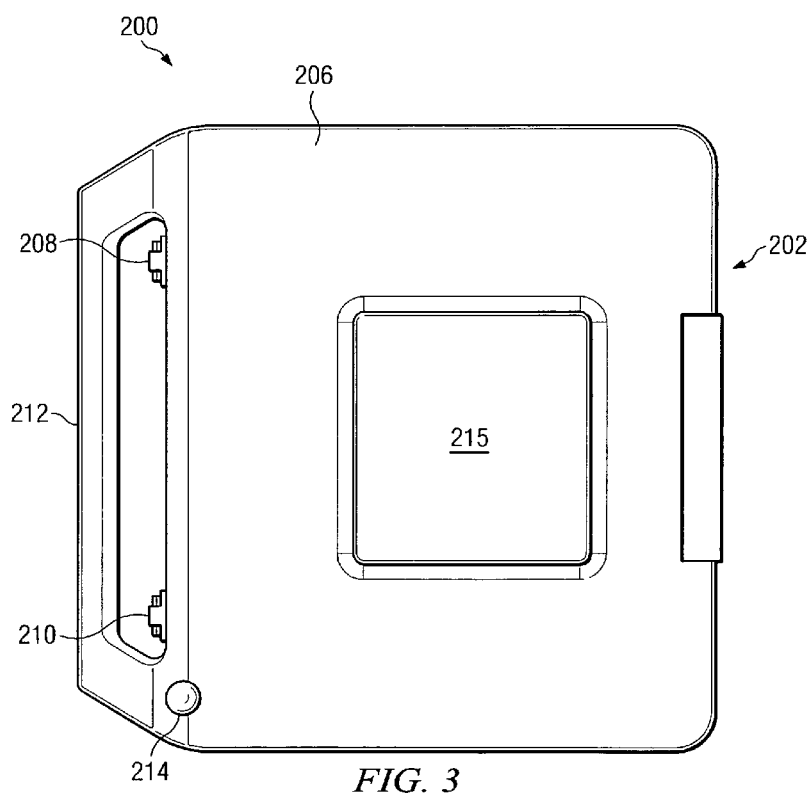
FIG. 3 is a rear view of the example portable satellite earth station of FIG. 2 when the clam shell of the example portable satellite earth station is closed.
Figure 4:
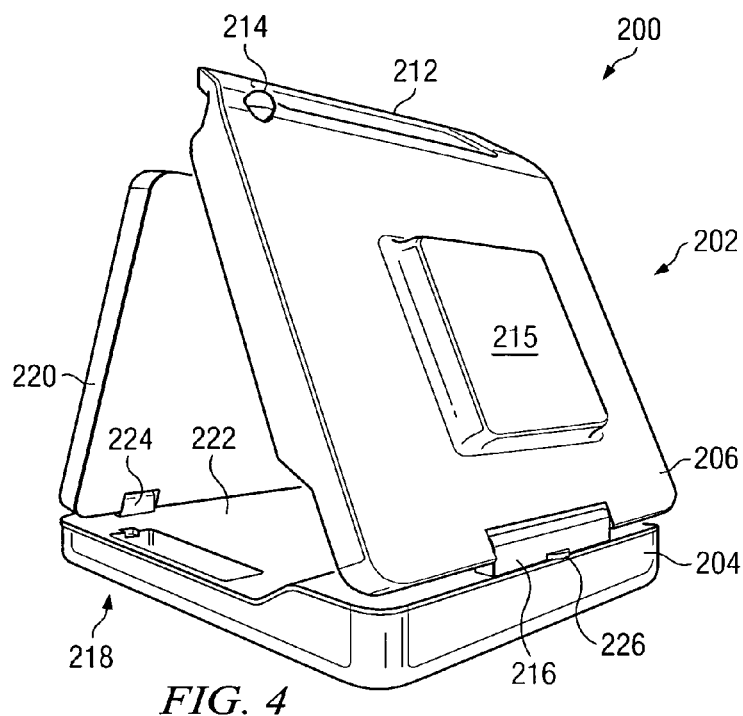
FIG. 4 is a perspective rear view of an example portable satellite earth station when the clam shell of the example portable satellite earth station is opened.
Figure 5:
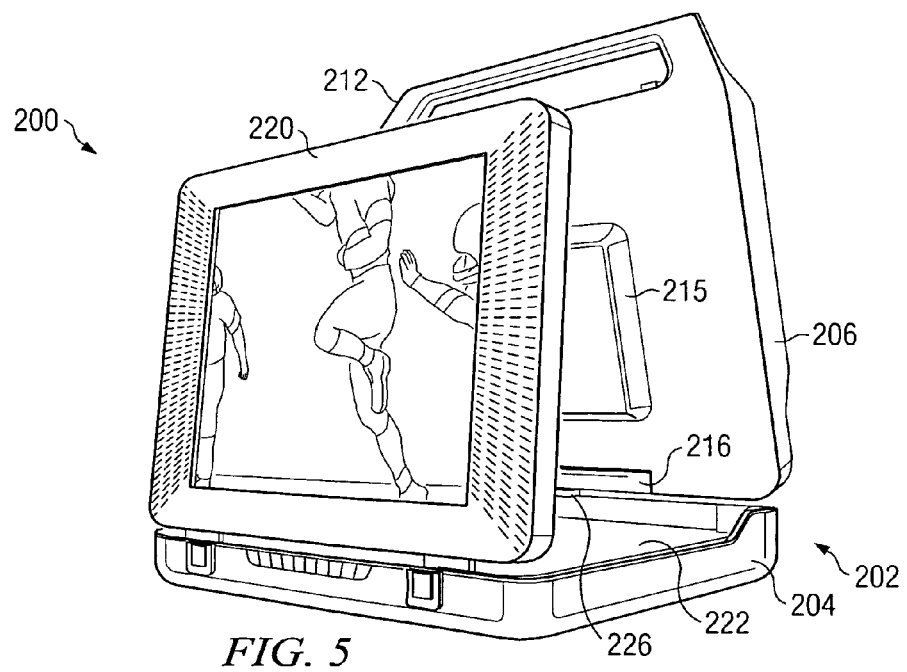
FIG. 5 is a perspective front view of the example portable satellite earth station of FIG. 4 where the antenna has been pivoted.
Figure 6:
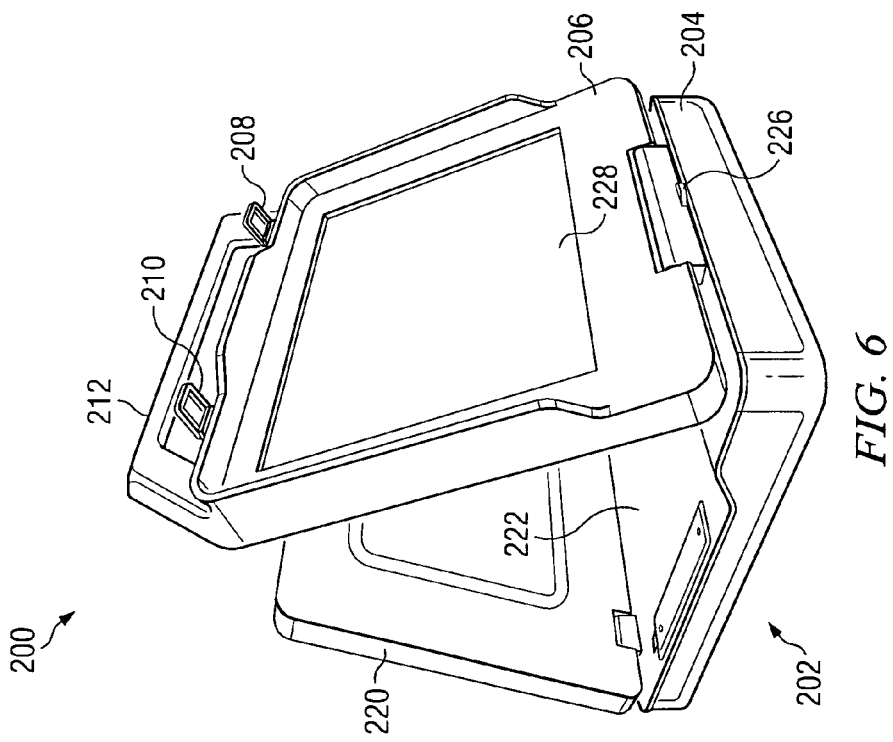
FIG. 6 is a perspective rear view of the example portable satellite earth station of FIG. 5.

FIGS. 2-6 show an example portable satellite earth station 200 in various states ranging from closed (FIGS. 2 and 3), to opened (FIG. 4), to opened with an antenna portion oriented to receive a satellite signal (FIGS. 5 and 6). As shown, in FIGS. 2 and 3, in one example the portable satellite earth station 200 includes a protective clam shell housing 202 including a base 204 and an antenna containing portion 206, which, when closed together protect electrical components, the display, and other parts of the portable satellite earth station 200 from damage. As can be seen, the antenna portion 206 forms a lid that is closed and retained to the base 204 by a number buckles 208, 210. The antenna portion 206 of the clam shell 202 includes an integral handle 212 to facilitate the carrying of the portable satellite earth station 200. Additionally, as described in detail below, the antenna portion 206 also includes an orientation device 214, such as a ball compass, that enables a user to properly orient the antenna in a manner that facilitates satellite signal reception. For example, the orientation device 214 provides indications of angle of elevation and/or direction (e.g., North, South, etc.).

Figure 2:
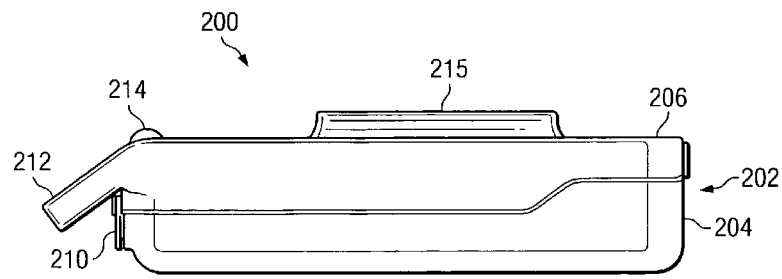
FIG. 2 is a side elevation view of an example portable satellite earth station.

With regard to dimensions, in one example, such as the example shown in FIGS. 2 and 3, the clam shell 202 may have a thickness of 5.1 inches, including the 0.9 inch feature 215 that accommodates a low noise block (LNB) of the antenna contained in the antenna portion 206. The overall height of the clam shell 202 including the handle 212 may be 19.5 inches, wherein the handle 212 is about 2.7 inches of that height. The width of the clam shell 202 may be approximately 19.5 inches.

As shown in FIG. 4, when the portable satellite earth station 200 is opened (i.e., the antenna portion 206 is unbuckled from the base 204 and pivoted upwardly via a hinge 216, a receive/display portion 218 is revealed. The receive/display portion 218 includes a display 220 coupled to a housing holding receiver hardware/software (i.e., the receiver portion 222) via one or more hinges, one of which is shown in FIG. 4 at reference numeral 224. During set up of the portable satellite earth station 200, first the antenna portion 206 is pivoted upward to reveal the display 220, which is then pivoted upwardly from the receiver portion 222.

As shown in FIGS. 5 and 6, subsequent to the antenna portion 206 being unbuckled and pivoted and the display 220 being pivoted upward, the antenna portion 206 is rotated with respect to the base 204 on a hinge 226 to properly position the antenna to receive satellite signals. That is, the electrically responsive or sensitive area 228 of the antenna portion 206 is downwardly facing and, therefore, protected when the portable satellite earth station 200 is closed, as shown in FIGS. 2-4. To place the sensitive area 228 of the antenna in a direction to receive a satellite signal, sensitive area 228 of the antenna portion 206 is generally rotated or pivoted away from the display 220 and, therefore, the user, and is pivoted toward a satellite signal source, such as open exposure to the sky, though a window, or otherwise.

As explained above, the sensitive area 228 of the antenna is faced outwardly from a user so that satellite signals can be received thereby. The sensitive area 228, therefore, provides an area on which electrically transparent displays may be placed. For example, stickers, endorsements, advertisements, messages, etc. may be placed on the sensitive area 228 which is displayed to all passers by at, for example, a football game, an auto race, etc.

Once the portable satellite earth station 200 is configured as shown in FIG. 6, the display 220 and the receiver portion 222 may be removed from the base 204, which is sized to accommodate the same. A radio frequency (RF) connector (e.g., an F-type, RG179 connector) having, for example, 15 feet of wire, connects the receiver portion 222 to the base 204, which includes a connection outputting the received antenna signal. In this manner the antenna portion 206 may be aligned to receive a satellite signal and the display 220 and associated electronics 222 may be moved to accommodate the desires of a user without disturbing signal lock between the antenna portion 206 and the satellite. For example, the antenna portion 206 and the connected base 204 may be placed on the roof of a vehicle during football game tailgating to achieve satellite signal reception. Meanwhile, the display may be moved as desired without disrupting satellite signal reception. Further details regarding the display 220 and the receiver portion 222, as well as the clam shell 202 are provided below. In other implementations, a wireless link may be provided in place of the cable.

Alternatively, other antennas may be coupled to the receiver portion 222. For example, a vehicle-based antenna, such as the TracVision antenna, may be used in conjunction with the receiver when the receiver is in a moving vehicle. The combination of a home antenna, a vehicle-based antenna, and the antenna of the portable satellite earth station provides total mobility of the portable satellite earth station, as well as continuity of service (e.g., the ability to use the system at home with a home-based satellite antenna, in the vehicle with a vehicle based antenna, and at remote sites with the portable antenna). Additionally, the antenna connection enables users in remote areas such as Alaska and Hawaii to receive services using large, high-gain antennas.

In the case of the vehicle-based antenna system, it is important to note that the system would track the user's location to detect whether or not the user is within a specified geographic region and as a result can allow access to programming and services based on the rights and allowances established for such programming and services.

Figure 7A:
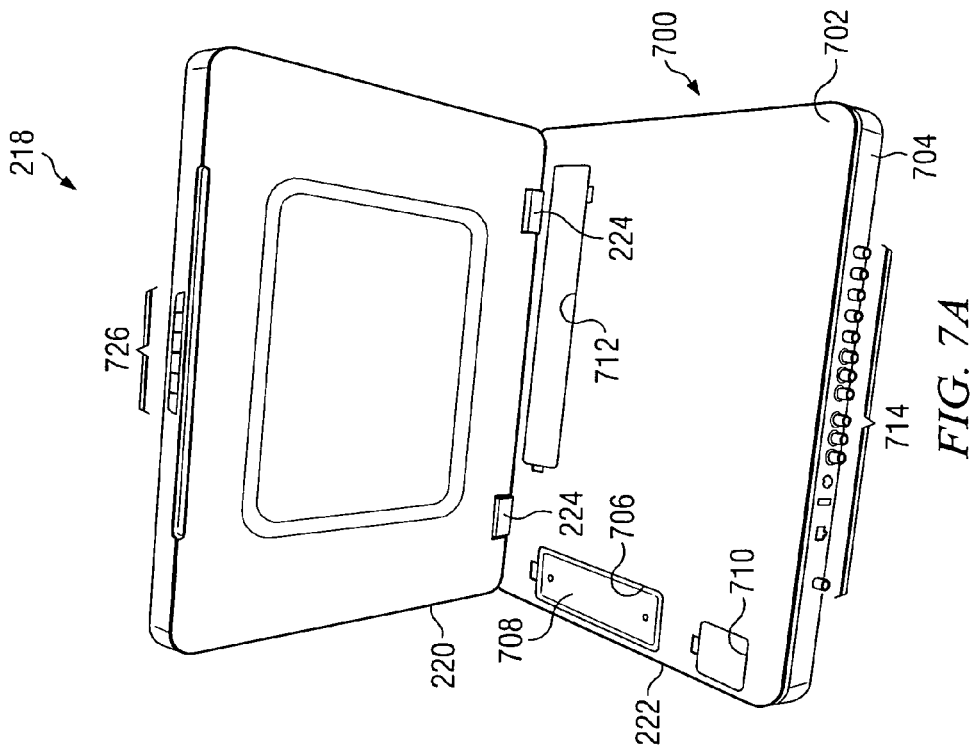
FIG. 7A is a rear view of the receiver/display portion of the portable satellite earth station.

Further details regarding the receive/display portion 218 are shown in FIGS. 7A and 7B, which respectively show rear and front views of the receive/display portion 218. As explained above, the receive/display portion 218 includes the display 220 that is connected to the receiver portion 222 through hinges 224. The receiver portion 222 acts as a base to support the pivoting of the display 220 about the hinges 224 to provide user adjustability of the display angle. For example, as shown in FIG. 7A, the display 220 is pivoted upward from the receiver portion 222, whereas in FIG. 7B the display 220 is pivoted down to the receiver portion 222. In one example, when folded flat as shown in FIG. 7B, the receive/display portion 218 may have a thickness of 2.8 inches, a height of 14 inches, and a width of 18.5 inches. When folded flat, the portable satellite earth station 200 may enter a hibernation mode during which the display screen and speakers will be turned off to conserve battery power.

The receiver portion 222 includes a housing 700 having a top portion 702 and a bottom portion 704. The top and bottom portions 702 and 704 may be plastic, nylon, or any other suitable material. The housing 700 encloses electronics that facilitate the reception and processing of satellite signals. Further detail regarding the electronics is provided below. The housing 700 also includes a number of features that facilitate access and/or storage of components related to the operation of the portable satellite earth station 200. For example, the top portion 702 includes a compartment 706 that stores a remote control 708, a compartment 710 having a door thereon behind which is a conditional access card interface is disposed to accept a conditional access card having a smart-card form factor. In one example, the smartcard interface may accommodate a 5/3.3V compatible, SIM Type smartcard.

Additionally the top portion includes a compartment 712 to facilitate power cord storage. The compartment 712 may also include a cover to retain the power cord within the housing 700 during storage and transportation. In one example, the power cord may be permanently connected to the portable satellite earth station 200 and may be 2 meters in length and have a three-prong plug on the end thereof.

Additionally, bottom portion 704 of the housing 700 includes an interconnection area 714 at which various connectors protrude or may be accessed. In one example, such as that shown in FIG. 7A, the interconnection area 714 is disposed in the rear of the bottom portion 704. However, those having ordinary skill in the art will readily recognize that the interconnection area 714 may be disposed in any suitable or desirable location on the receive/display portion 218.

As shown in FIG. 7B, the bottom portion 704 of the housing 700 also includes a user interface 716 through which a user may control the satellite receiver electronics within the receiver portion 222. Further detail regarding the user interface 716 is provided below.

The display 220 includes a display screen 718 that is disposed within a display housing 720 having a front portion 722 and a rear portion 724. Additionally, as shown in FIG. 7A, the display 220 includes a user interface 726 through which a user can interact with and control television operational aspects of the receiver portion 222. Further details regarding the user interface 726 are provided below. The display 220 also includes a power indicator 728, such as a light emitting diode (LED) that illuminates when the power is on and blinks when the portable satellite earth station 200 receives commands from a remote control unit. In one example, the LED may be a blue LED or may be any other suitable color.

FIG. 8 shows an example user interface 716 through which a user may control the satellite receiver electronics within the receiver portion 222. Although not shown in FIG. 8, the user interface 716 includes an infrared sensor for receiving signals from a remote control unit. The keys on the user interface 716 include: signal 802, guide 804, menu 806, down 808, up 810, select 812, left 814, right 816, active 818, and info 820. These keys allow a user to navigate through the functionality provided by the receiver electronics. In one example, the functionality of some of these keys may be similar or identical to the functions provided by similar keys on the DIRECTV D11 model integrated receiver decoder (IRD). Also included for user interface purposes is a reset button placed behind a conditional access module in compartment 710.

The signal key 802 is a key that initiates a macro that allows a user to jump directly to a signal bar screen that includes video and audio feedback regarding received signal strength without the user having to navigate through layers of menus to access the signal strength meter. The signal bar screen provides visual and audible feedback reflective of the satellite signal strength received by the portable satellite earth station 200. That is, the more properly oriented toward the satellite the antenna of the portable satellite earth station 200 is, the stronger the signal strength will be and this fact will be reflected audibly and by an on-screen signal meter. Advantageously, by providing a single key to initiate antenna directional tuning feedback, placement and orientation of the antenna by a user is made easier. Because the unit 200 is portable, it may be moved frequently to different locations and the signal key 802 facilitates faster antenna orientation.

While the signal key 802 and its attendant functionality are described as being part the user interface of the receiver portion 222, this need not be the case. In fact, the signal key 802 and its associate alignment feedback may be implemented as part of the housing containing the antenna being positioned. Such an arrangement allows the antenna to be positioned without the need for such a task being performed near the display screen. In one example, the antenna structure would include a visual or audible feedback source that a user could observe to assist in antenna positioning. Such alignment circuits and software could be programmed or tuned to only receive compatible satellite signals so that only satellites carrying information processable by the receiver hardware associated with the antenna may be registered or detected on the tuning tool.

Figure 9:
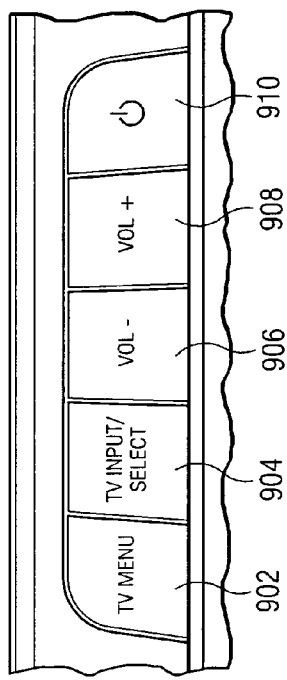
FIG. 9 a drawing showing user interface controls that may be provided to control television aspects of the portable satellite earth station.

FIG. 9 shows an example user interface 726 having a TV menu key 902, a TV input/select key 904, a vol − key 906, a vol + key 908, and a power key 910. The TV menu key 902 invokes a television menu, which may have a similar menuing structure to any known or later developed television menuing system.

The TV input/select key 904 enables a user to select programming content for display from either the satellite receiver, or, in the alternative, from any external video and/or audio programming sources. For example, if an external video source is provided at one of the audio/video inputs to the portable satellite earth station, that external video input may be selected for viewing. In such a circumstance, when the satellite receiver and antenna are not being used the same may be powered down to conserve current consumption within the portable satellite earth station 200.

The volume and power keys 906, 908, 910 have the same effect on the operation as they would on a normal television. That is the volume keys adjust the audio level emitted by the speakers of the portable satellite earth station 200 and the power key 910 powers the portable satellite earth station up or down.

Figure 10:
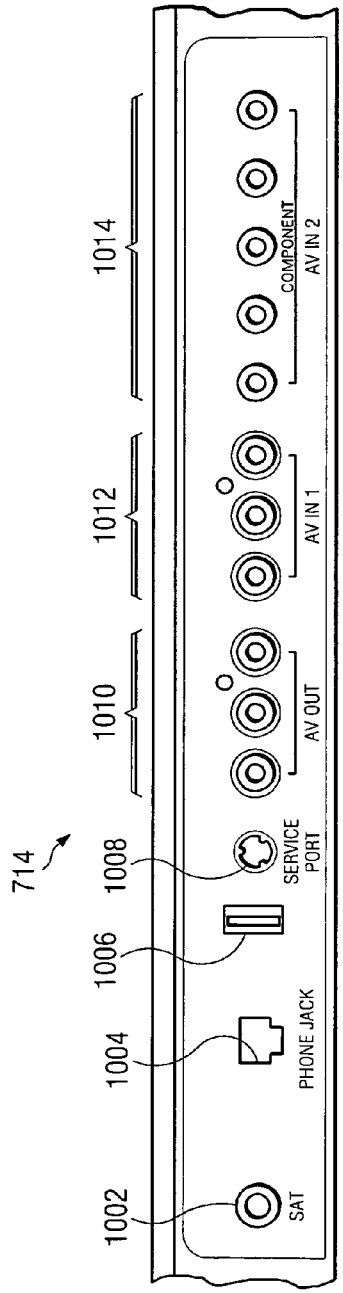
FIG. 10 is a drawing showing the inputs and outputs of the portable satellite earth station.

FIG. 10. shows additional detail of the interconnection area 714. In one example, the interconnection area 714 includes a satellite input 1002 (e.g., an F-type RF connector), a telephone jack 1004 (e.g., an RJ-11, female, 2-wire connector for modem), a universal serial bus (USB) 2.0 Type A, serial over USB communication support connection 1006, a television service port 1008 (e.g., an RS-232 serial port for TV software upgrade), AV Out connections 1010 (e.g., RCA-type connectors for composite audio/video output), AV In 1 connections 1012 (e.g., RCA-type connectors to receive composite audio/ video input signal, and AV In 2 connections 1014 to receive component audio and video input signals (e.g., Y Pb Pr at resolutions of 480i/p, 720p, and/or 1080i).

The satellite input 1002 accommodates satellite signals from any number of different antennas. For example, the satellite input 1002 may receive signals from the antenna of the portable satellite earth station, from another provide such as KVH, or from a home-based antenna such as those installed at residences by DIRECTV.

Figure 11:
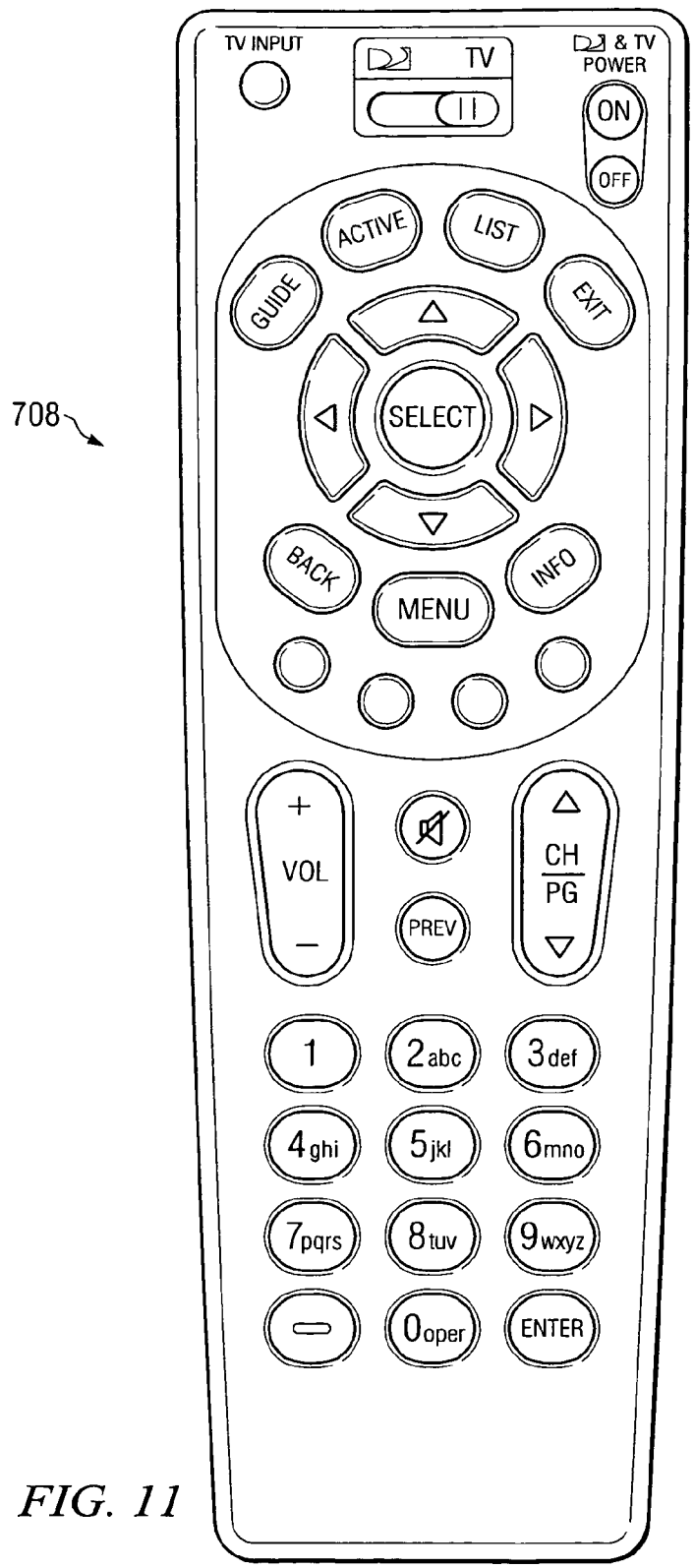
FIG. 11 is a drawing of an example remote control that may be used in conjunction with the portable satellite earth station.

FIG. 11 shows an example remote control unit 708 that may be used in conjunction with the portable satellite earth station 200 and, in fact, may be stored within the portable satellite earth station 200 as shown in FIG. 7A. In one example, the remote control unit 708 is rectangularly shaped and has a height of 6.24 inches, a width of 2.047 inches, and a depth of 0.866 inches. In such an arrangement, the buttons may have a height of 1.5-2 mm.

Figure 12B:
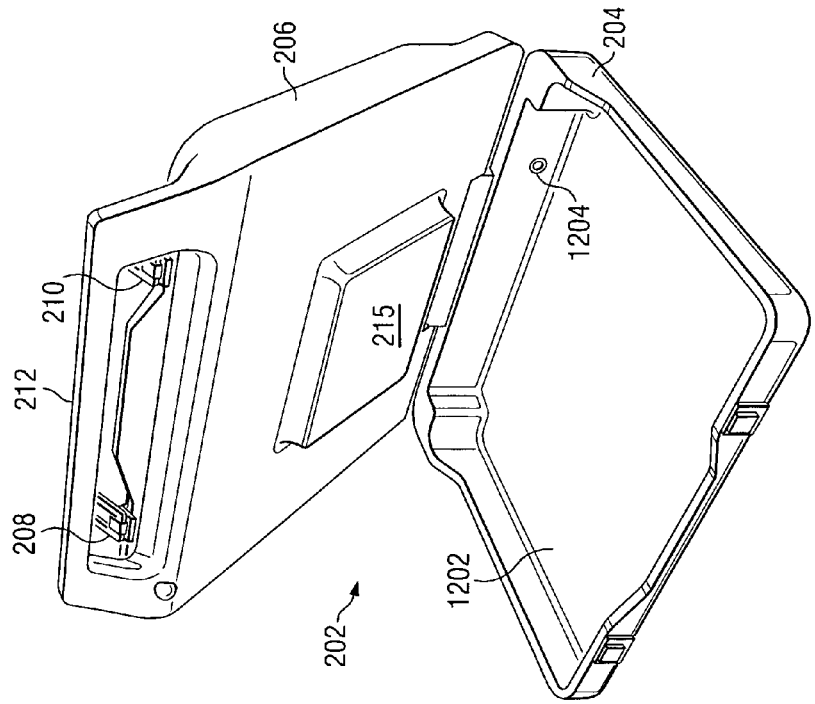
FIGS. 12A and 12B show an opened clam shell of the portable satellite earth station of FIG. 1, wherein the receiver/display portion has been removed therefrom.
Figure 12A:
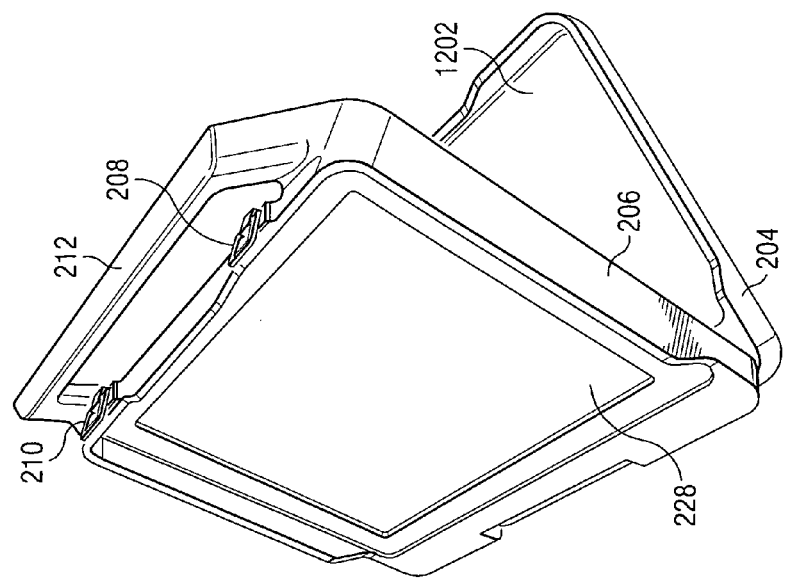

Additional details related to certain aspects of the clam shell housing 202 are shown in FIGS. 12A and 12B. As shown, the base 204 includes a compartment 1202 into which the receiver portion 222 may be inserted. Additionally, as shown in FIG. 12B, the compartment 1202 includes an antenna line connector 1204, such as an F connector that enables the receiver portion 222 to be connected to receive the antenna signal when the receiver portion 222 is removed from the compartment 1202. Again, a wireless link may be provided in place of any cable connection to facilitate signal communication.

Figure 13A:
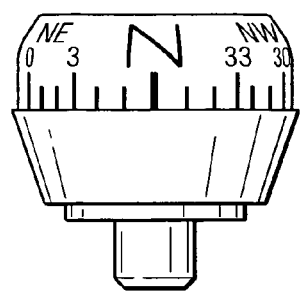
FIGS. 13A-13D show a compass and associated artwork that may be implemented in the clam shell of the portable satellite earth station.
Figure 13B:
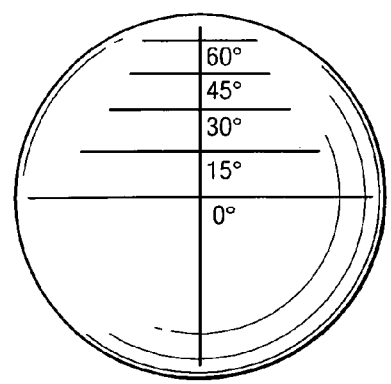
Figure 13C:
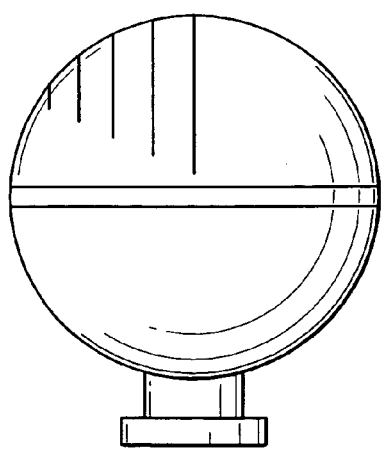
Figure 13D:
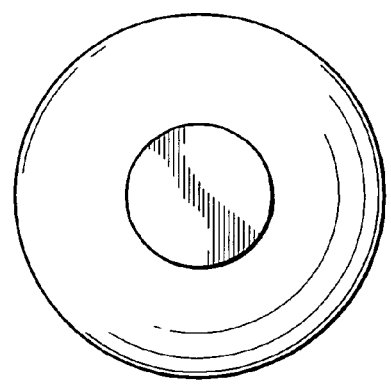

An example orientation device 214 is shown in FIG. 13A as a ball compass 1302, which is free to rotate about both horizontal and vertical axes. FIGS. 13B and 13C show silk screening 1304 that is placed on a container holding the ball compass 1302 to reflect the angle of the antenna portion 206 with respect to the horizontal. That is, when the antenna portion 206 is vertical, a reading of zero degrees is read on the silk screen 1304 relative to a marker on the ball compass. As the antenna portion 206 is angled with respect to the vertical, the marker on the ball compass will align with other angular markings (e.g., 15°, 30°, 45°, 60°, etc.) to reflect the angle of the antenna portion. In addition to showing the angle of the antenna portion 206, the ball compass reflects the direction of the antenna portion 206 (e.g., North, South, East, West, etc.). Thus, using the ball compass 1302 in combination with the silk screening or other markings 1304, the angle and direction that the antenna is facing may be determined. For example, if a person in Chicago desires to receive DIRECTV service from a satellite in the 101 West orbit, he/she can use the ball compass 1302 to point the antenna portion 206 toward the direction of 199.5 degrees at an angle of 39.9 degrees. Then, using the signal macro described above, may fine tune the positioning of the antenna based on the received signal strength from the satellite.

Figure 14:
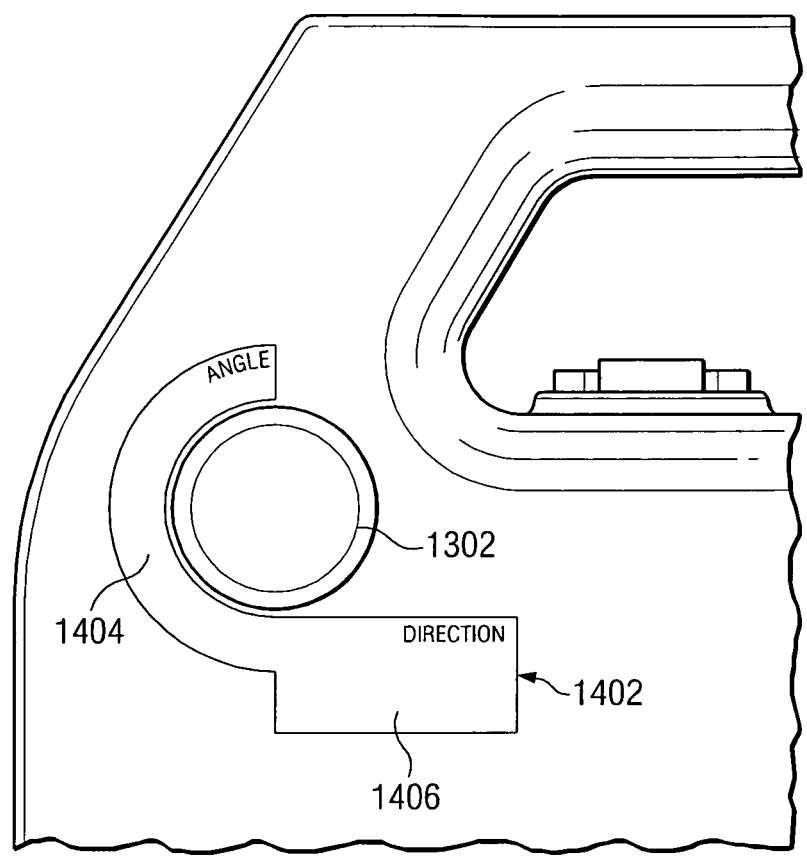
FIG. 14 is a drawing showing artwork that may be installed on the clam shell of the portable satellite earth station, on which angle directional positions of the antenna may be recorded.

FIG. 14 shows a legend 1402 on which a user may mark an angle and direction, as read by the ball compass 1302, to achieve satellite signal reception. The legend 1402 may be formed as part of the antenna portion 206 or may be a sticker, a decal or any other suitable element affixed thereto. The legend 1402 enables a person to make lines in an angle area 1404 using a marking pen or pencil to indicate a desired angle by making a tick mark on the legend 1402 that corresponds to a reference point on the ball compass. Similarly, a user may use a marking pen to indicate the direction to which the angle corresponds in a direction area 1406.

Figure 15:
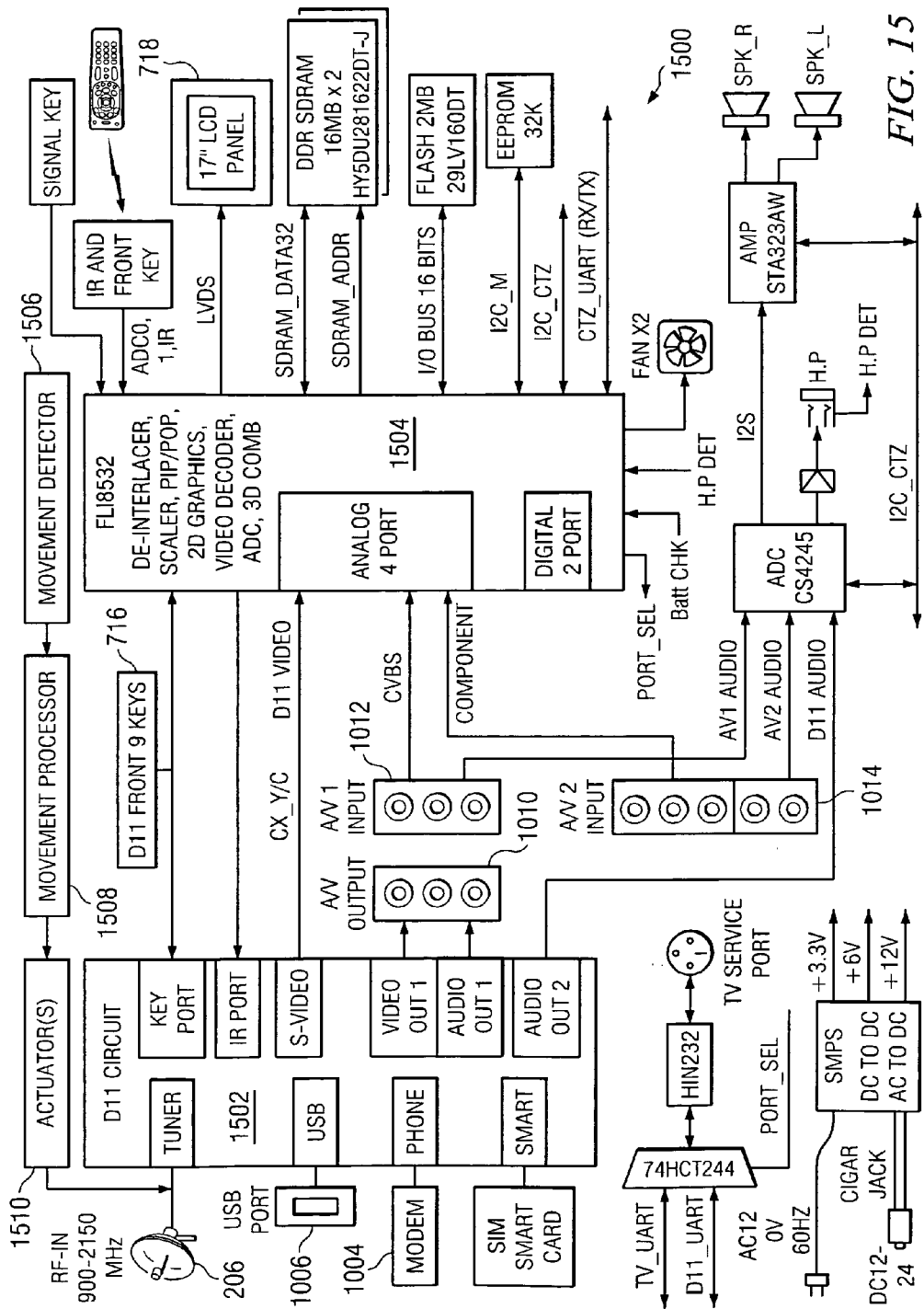
FIG. 15 is a schematic diagram of the electrical hardware and/or software used to facilitate the operation and/or carry out the described processes of the portable satellite earth station.

FIG. 15 is a schematic drawing of a system 1500 that may be used to implement the electrical and processing aspects of an example portable satellite earth station 200. In one example, the system includes a circuit 1502 that implements DIRECTV D11 IRD functionality. In general, the circuit 1502 receives inputs from the antenna portion 206, A, a USB port 1006, a telephone jack 1004, and a smart card interface that supports the conditional access module. The circuit 1502 also receives input from the user interface 716 and is communicatively coupled to a digital video processor and LCD television controller 1504.

The circuit 1502 may be implemented using a main CPU/ MPEG Decoder/Graphics/OSD having model number CX24155. Such a device includes an ARM920T Main System CPU, which is a 32-bit CPU (248 Dhrystone 2.1 MIPS at 225 MHz) and includes a 16 KB I-Cache, 16 KB D-Cache, and a 143 MHz, 16 or 32-bit SDRAM controller. The CX24155 further includes an internal QPSK demodulator, an internal channel ¾ RF modulator, and a single MPEG2MP@ML Video Decoder. Additionally, the CX24155 includes an ISO 11172 Layer I & II (MUSICAM) Audio Decoder, an advanced 2D graphic accelerator, and has multi-region OSD functionality.

The front end processing of the circuit 1502 may be performed using a CX24109 Silicon Satellite Tuner and may have Diseqc 2.0 support. The front end processing may be performed on input signals between 950 MHz to 2.15 GHz As shown in FIG. 15, the system 1500 includes FLASH Memory such as 4 MB (16 bit) of memory with two 128 KB OTP memories. These memories may be provided by any suitable supplier including, for example, Intel under model number RC28F320J3C in a ball grid array (BGA) package or STM under model number M58LWO32D in a BGA package. The system 1500 also includes SDRAM memories, which may total 32 MB. These memories may be available from Samsung as model K4S561632E-TC75, 133 MHz or from Hynix under model number HY57V561620CT-H, 133 MHz. The system 1500 also uses 32 KB of non-volatile memory.

The controller 1504 may be implemented using a digital video processor and LCD TV controller in the form of a 416-ball BGA bearing model number FLI8532. Such a device includes an integrated X186 based microcontroller, an integrated 3D video decoder, and Faroudja DCDi Cinema™ Video Format Conversion, enhancement, and noise reduction functionality. The FLI8532 also includes VBI Signal Processing that supports Teletext, EPG, Closed Caption, and V-Chip as per EIA/CEA-608-B standards, and a 16 true color bitmap OSD. The LCD panel output from the FLI8532 supports LVDS & TTL formats. The controller 1504 uses 2 MB (16 bit) of Flash memory (e.g., STM M28W160CT90N6), 32 MB of DDRRAM (e.g., HYNIX HY57V281622CT-H, 200 MHz) and 8 KB of non-volatile EEPROM.

The display screen 718 may be implemented using a LCD SAMSUNG display bearing model number LTM170EU-L35. Such a device includes the following attributes:

A-Si TFT LCD (Transflective)
Resolution: SXGA 1280×1024 pixels
Pixel pitch: 0.264×0.264 (mm)=0.0104×0.0104 (inches)
Refresh Rate: 5 ms
Viewing angle: H (Left, Down) 80°×80°, V (Up, down) 80°×80°
Module size: W×H×D=358.5×296.5×17.5 (mm)=14.1×11.7×0.69 (inches)
Display area: W×H=337.92×270.336 (mm)=13.3×10.64 (inches)
Interface: LVDS
Back light: Cold Cathode Fluorescent Tube (CCFT)
Contrast Ratio: 1000:1

The system 1500 of FIG. 15 may consume on the order of 65.5 W maximum and may be powered by 120V AC, 60 Hz or DC 12V, 5 A. An optional battery may provide an hour of power and may be a 12.6V, 4.7 A battery that uses Lithium-ion technology. In one example, the battery may include a spring loaded plastic cover to cover the battery contacts and to prevent the same from being touched by human hands. Additionally, the battery may be completely enclosed or encased in a plastic housing or the like. The battery may be trickle charged by AC or DC power sources. The system may provide visual feedback to a user when the battery power is low and/or when the battery is being charged. Additionally, the system may provide a visual indication of the battery charge source (e.g., AC wall outlet, DC adapter, etc.). The system may also provide visual feedback when the system temperature or that of any desirable component of the system reaches an unacceptable high level.

As also shown in FIG. 15, the system 1500 may include a movement detector 1506, a movement processor 1508, and one or more actuators 1510. Collectively, these components enable antenna movements to be nulled out once satellite signal lock is achieved. Thus, these components make it possible to use the portable satellite earth station in locations such as on boats or other craft that may move in a manner that would normally cause loss of signal lock.

The movement detector 1506 may be one or more gyroscopes capable of detecting accelerations in any direction. The output signals from the movement detector 1506 are coupled to the movement processor, which determines counteracting movements to be applied to the antenna portion 206 to counteract movement that the base of the antenna portion experienced (e.g., the movement of a ship in response to waves, etc.). The movement processor 1508 passes these counteractive movements to actuators 1510, which may be solenoids, servo motors, etc. In response to the signals from the movement processor 1508, the actuators 1510 move the antenna portion 206 either in angle (i.e., pivoting in the up or down directions) or in direction (i.e., pivoting about the vertical axis to change the compass direction the antenna portion 206 is facing. This control loop in which movements are counteracted by antenna movements to maintain antenna alignment increases the number of venues in which the portable satellite earth station 200 may be used. Additionally or alternatively, antenna beam steering may be used to control the direction of the antenna, whereby the antenna is not physically moved, but the phasing of the elements used to detect electrical signals is changed to effectively steer the main lobe of the antenna.

In one example, the system 1500 provides personal video recording functionality, wherein desired programming may be stored in memory or on a hard drive or the like. This would facilitate use of the portable satellite earth station as a portable media player. Additionally, personal media devices, such as I-PODs and the like may be synchronized to the stored programming via a port such as the USB interface.

In addition, the system 1500 may include uplink circuitry to facilitate the broadcast of information from the portable satellite earth station to a satellite for further distribution. Such connections could be facilitated using services such as Wildblue, DIRECTWAY, and the like. The uplink circuitry facilitates two-way capability and, thereby, enables functionality such as video conferencing. Thus, the portable satellite earth station may include an integrated video camera and microphone to facilitate such functionality. Additionally or alternatively, the system 1500 may include circuitry to provide backchannel communications through a wireless network, such as an 802.11x network, a cellular network, or the like. Also, voice over Internet protocol (VOIP) functionality may be provided. The system 1500 may also provide communications services compatible with, for example, the OnStar system or other similar system.

FIG. 16 shows a layout of menus 1600 that may be presented to a user of the portable satellite earth station 200 when the TV menu button 902 of the user interface 726 is pressed. When the TV menu button 902 is pressed, the user is presented with a first level of menu options 1602, which is represented by the leftmost column of FIG. 16. The first level of menu options includes: picture, sound, settings, and parental controls.

Upon selection of a menu option from the first level 1602, the user may select from a second level 1604 of menu options related to the selected option from the first level 1602. Upon selection of an option from the second level 1604, the user is presented with a third level 1606, which is represented in the rightmost column of FIG. 16. In some cases, there is an additional column 1608, which represents additional layers of menuing. Using this menu configuration, a user can select and customize the operational aspects of the portable satellite earth station 200.

The foregoing has described example portable satellite earth stations as more/less self contained devices. However, in other implementations, the satellite receiver hardware may be packaged to accompany a conventional or later developed laptop or notebook computer. For example, turning to FIG. 17, a notebook computer 1702 may be paired with satellite receiver hardware 1704 and, if needed, software running on the notebook computer 1702 to form a portable satellite earth station.

Figure 17:
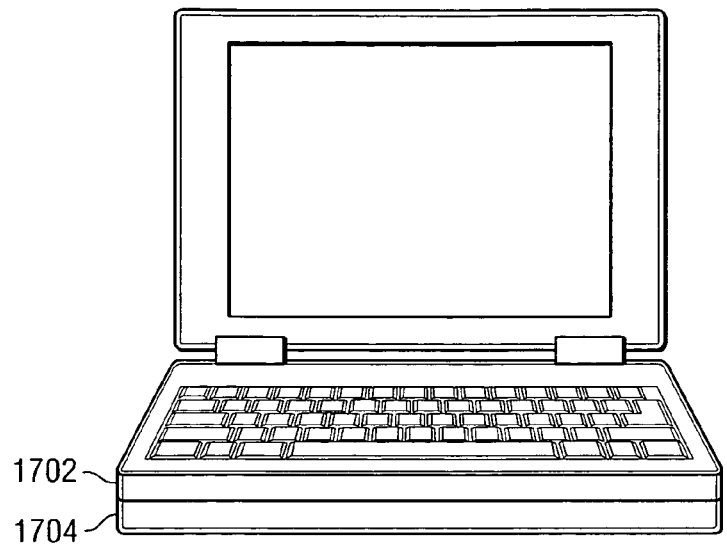
FIG. 17 shows an alternate implementation of a portable satellite earth station.

The satellite receiver hardware 1704 can be formed as a base station onto which the notebook computer 1702 is fitted. Signals such as control signals, video signals, audio signals, and the like may be exchanged between the notebook computer 1702 and the satellite receiver hardware 1704 through any number of different interconnect schemes. In one example, the satellite receiver hardware 1704 may include a connector adapted to mate with a docking connector on the bottom of the notebook computer 1702. Alternatively, information may be exchanged between the satellite receiver hardware 1704 and the notebook computer 1702 though serial or parallel connections, such as, for example, an IEEE 1394 "firewire" interface or a USB connection. Advantageously, the docking station form factor for the satellite receiver hardware 1704 enables the satellite receiver hardware 1704 to be quickly and easily coupled to the notebook computer 1702. Additionally, while coupled together, the satellite receiver hardware 1704 is merely an extension of the mechanical packaging of the notebook computer 1702. In the configuration of FIG. 17, the satellite antenna may be coupled to the notebook computer or may be free standing.

Figure 18:
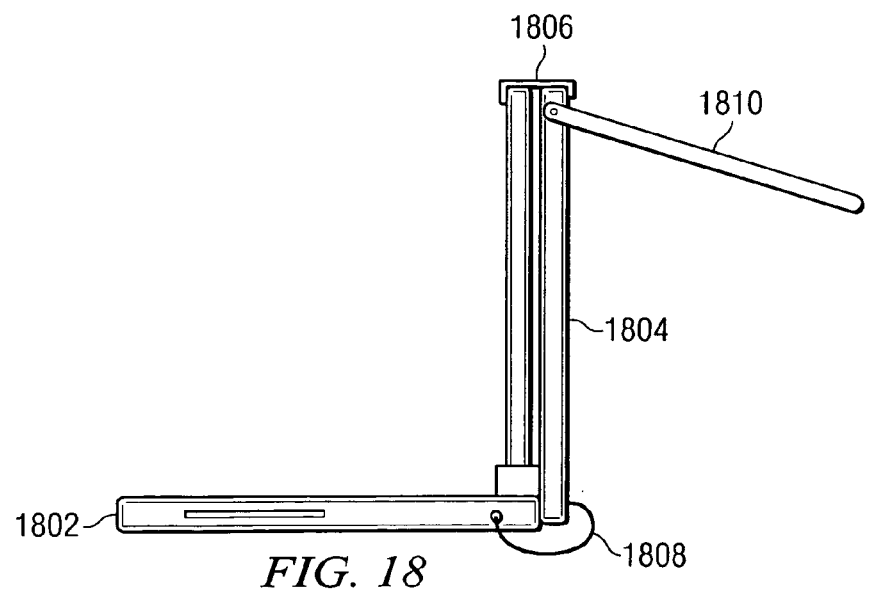
FIG. 18 shows a second alternate implementation of a portable satellite earth station.

A further alternative system merging a notebook computer 1802 and satellite receiver hardware 1804 is shown in FIG. 18. As shown in FIG. 18, the satellite receiver hardware 1804 is mounted to the rear (when the lid is open) or top (when the lid is closed) of the notebook computer 1802. One or more mounts 1806 may be provided to attach the satellite receiver hardware 1804 to the lid of the notebook computer 1802. Signals may be exchanged between the notebook computer 1802 and the satellite receiver hardware 1804 using a cable 1808 or any other interface such as an IEEE 1394 interface and/or a USB interface. Alternatively, the satellite receiver hardware may be implemented as an add-in card (such as a PCMCIA card) that is inserted into the computer. In such an example, the antenna signals may be coupled directly to such a card or may be provided to the card via any other interface, such as those mentioned above.

As shown in FIG. 18, an antenna 1810 may be mounted to the satellite receiver hardware housing 1804 so that the antenna 1810 can be pivoted in both horizontal and vertical directions to obtain satellite signals.

Having described the architecture of example systems that may be used to implement a portable satellite earth station, various processes are described. Although the following discloses example processes through the use of flow diagrams having blocks, it should be noted that these processes may be implemented in any suitable manner. For example, the processes may be implemented using, among other components, software or firmware executed on hardware, dedicated hardware blocks, or manual operations. However, this is merely one example and it is contemplated that any form of logic may be used to implement the systems or subsystems disclosed herein. Logic may include, for example, implementations that are made exclusively in dedicated hardware (e.g., circuits, transistors, logic gates, hard-coded processors, programmable array logic (PAL), application-specific integrated circuits (ASICs), etc.) exclusively in software, exclusively in firmware, or some combination of hardware, firmware, and/or software. For example, instructions representing some or all of the blocks shown in the flow diagrams may be stored in one or more memories or other machine readable media, such as hard drives or the like. Such instructions may be hard coded or may be alterable. Additionally, some portions of the process may be carried out manually. Furthermore, while each of the processes described herein is shown in a particular order, those having ordinary skill in the art will readily recognize that such an ordering is merely one example and numerous other orders exist. Accordingly, while the following describes example processes, persons of ordinary skill in the art will readily appreciate that the examples are not the only way to implement such processes.

Figure 19:
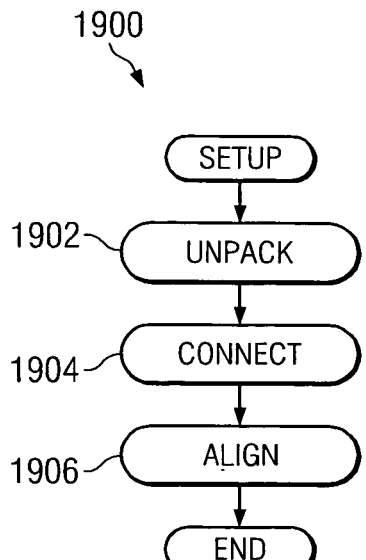
FIG. 19 is a flow diagram representing an example process that may be used to setup the portable satellite earth station.

FIG. 19 shows a setup process 1900 that a user may carry-out to setup and configure a portable satellite earth station for use. First, a user unpacks the portable satellite earth station (block 1902), and then connects the portable satellite earth station to, for example, AC or DC power, and/or a satellite antenna (block 1904). Subsequently, the user aligns the antenna to receive signals from a satellite (block 1906).

Figure 20:
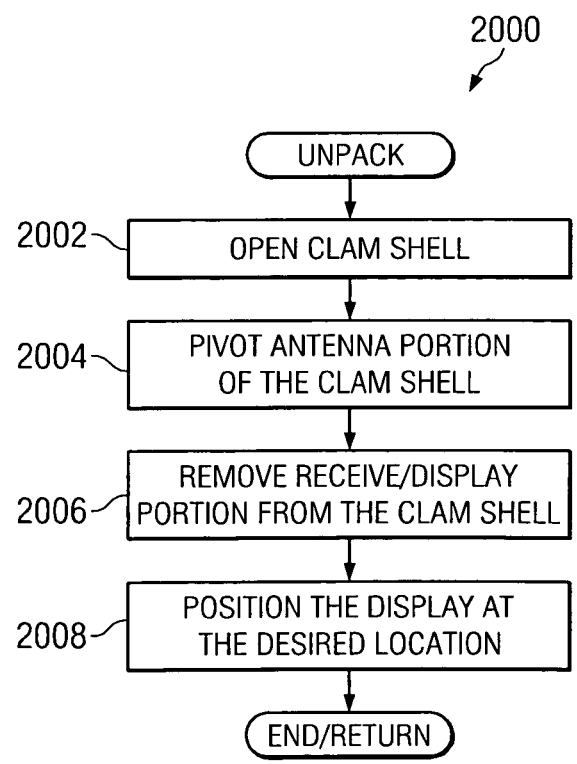
FIG. 20 is a flow diagram representing an example unpack process that may used in conjunction with the example process of FIG. 19.

Further detail regarding the unpack process 1902 is provided in FIG. 20. According to one example, a user opens the clam shell housing by, for example, pivoting the antenna containing portion 206 away from the base portion 204 to expose the a receive/display portion 218 (block 2002).

The user then pivots the antenna containing portion 206 of the clam shell to face the sensitive portion of the antenna containing portion 206 toward a satellite signal source (block 2004).

After the antenna containing portion 206 is pivoted (block 2004), the user removes the receive/display portion 218 from the clam shell housing (block 2006) and positions the display at a desired location for viewing (block 2008).

Figure 21:
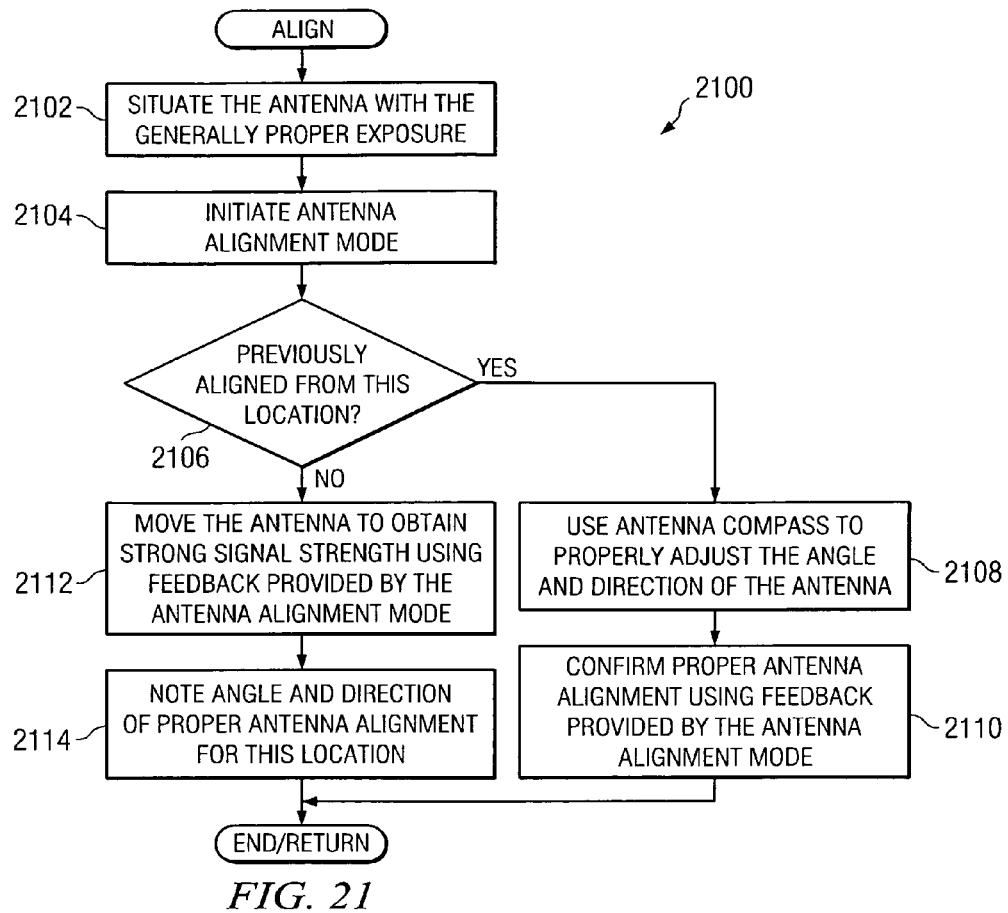
FIG. 21 is a flow diagram representing an example align process that may used in conjunction with the example process of FIG. 19.

An example align process 2100, as shown in FIG. 21, begins when the use situates the antenna with the generally proper exposure (block 2102). For example, the user may generally orient the antenna in a direction from which a satellite signals are expected to be received (i.e., generally Southwest).

The user then initiates an antenna alignment mode by, for example, actuating the signal key 802 on the user interface 716, which launches the foregoing-described alignment macro (block 2104).

If the user has previously aligned the satellite antenna from the present physical location (block 2106), the user may utilize the orientation device (e.g., a ball compass) to adjust the angle and the direction of the antenna based on prior alignments at that location (block 2108). The user then confirms the proper antenna alignment using feedback provided by the antenna alignment mode (block 2110).

However, if the user has not previously aligned the antenna from the present location (block 2106), the user will move the antenna to obtain strong signal strength based on the feedback provided by the antenna alignment mode (block 2112). Once the antenna is aligned (block 2112), the user will note the angle and direction of proper antenna alignment for the present location (block 2114).

Figure 22:
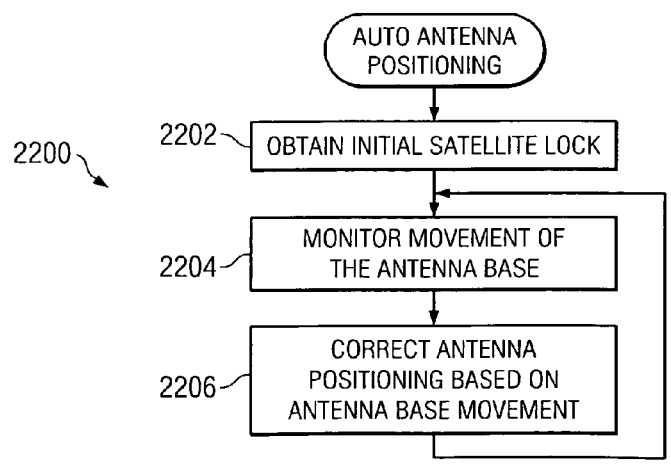
FIG. 22 is a flow diagram representing an example auto antenna positioning process that may be used to position an antenna of a portable satellite earth station.

An automatic antenna positioning process 2200, as shown in FIG. 22, includes obtaining an initial satellite lock (block 2202), which may be carried out manually through the use of the antenna alignment mode. After the antenna is aligned (block 2202), movement of the antenna base is monitored (block 2204). As noted above, movement monitoring may be carried out using any suitable techniques or hardware, such as gyroscopes, etc.

When movement is detected (block 2204), the antenna position is corrected by moving the antenna based on the detected movement to null out the detected movement (block 2206). The antenna position may be corrected using motors, servos, or any other type of positioning technology. Alternatively or additionally, the antenna may be a beam-steered array and, rather than physically moving the antenna, the direction of the beam steering array may be changed through phasing of signals read from array elements.

Although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A portable satellite earth station to facilitate reception of satellite signals and to display audio and video corresponding to the satellite signals:
    a housing including a base hingably coupled to an antenna containing portion via a first hinge and a pivotably coupled to the antenna containing portion via a first pivot, the first hinge and the first pivot located on a first side of the base, wherein the base includes a compartment; and
    a receiver/display configured to fit into the compartment, the receiver/display including a video display portion hingably connected to a receiver portion via a second hinge located at or near a second side of the base opposite the first side of the base and movable between a folded position and an unfolded position, wherein the receiver/display may be moved to the unfolded position when the receiver/display is located in the compartment in the housing and the antenna containing portion can be closed into contact with the base over the receiver/display when the receiver/display is in the folded position.

2. The portable satellite earth station of claim 1, wherein when the receiver/display is inserted into the compartment in the housing a hinge connecting the video display portion to the receiver portion is opposed to a hinge connecting the base to the antenna containing portion.

3. The portable satellite earth station of claim 1, wherein the antenna containing portion covers the video display portion when the antenna containing portion is closed into contact with the base.

4. The portable satellite earth station of claim 1, wherein the receiver/display is separable from the housing.

5. The portable satellite earth station of claim 1, wherein the receiver/display is electrically coupled to an antenna disposed within the antenna containing portion.

6. The portable satellite earth station of claim 5, wherein the receiver/display is electrically coupled to the antenna via a detachable wire that is connected prior to shipment of the portable satellite earth station to a user.

7. The portable satellite earth station of claim 5, wherein the receiver/display is electrically coupled to the antenna via a wireless link.

8. The portable satellite earth station to claim 5, wherein the antenna containing portion further comprises a low noise block.

9. The portable satellite earth station of claim 1, wherein the antenna containing portion includes an electrically responsive area that is covered by an electromagnetically transparent material.

10. The portable satellite earth station of claim 9, wherein the electromagnetically transparent material comprises a visual message.

11. The portable satellite earth station of claim 10, wherein the visual message comprises an advertisement.

12. The portable satellite earth station of claim 1, further comprising a carrying handle integrated into the housing.

13. The portable satellite earth station of claim 1, wherein the receiver/display further comprises a cord storage compartment.

14. The portable satellite earth station of claim 13, wherein the receiver/display further comprises a remote control storage compartment.

15. The portable satellite earth station of claim 1, wherein the housing further includes a compass for rotational and elevational positioning of the antenna, wherein the compass includes elevational indication.

16. The portable satellite earth station of claim 15, wherein the compass is located on an external portion of the antenna containing portion.

17. The portable satellite earth station of claim 15, wherein the housing further includes an area proximate the compass to accommodate antenna positioning markings by a user.

18. The portable satellite earth station of claim 1, wherein an antenna within the antenna containing portion comprises a self-pointing antenna to facilitate alignment to receive a satellite signal.

19. The portable satellite earth station of claim 18, wherein the self-pointing antenna comprises a motor.

20. The portable satellite earth station of claim 18, wherein the self-pointing antenna comprises a beam steering antenna array.

21. The portable satellite earth station of claim 18, wherein the self-pointing antenna includes acceleration detectors to determine how the antenna has moved from alignment.

22. The portable satellite earth station of claim 1, wherein the receiver/display includes an external antenna connection to which antennas other than an antenna in the antenna containing portion may be connected.

23. The portable satellite earth station of claim 1, wherein the receiver/display further includes a card slot to accommodate a SIM-type smartcard.

24. The portable satellite earth station of claim 1, wherein the receiver/display is configured to provide audible and visual prompts to assist a user in positioning an antenna within the antenna containing portion to receive satellite signals in response to a user selection.

25. The portable satellite earth station of claim 24, wherein the audible and visual prompts are configured to be responsive only to satellite signals carrying information useful to the portable satellite earth station.

26. The portable satellite earth station of claim 1, further comprising a battery charger to charge a battery of the portable satellite earth station.

27. The portable satellite earth station of claim 26, further comprising a visual indicator provided on the receiver/display to indicate when the battery is charging and to indicate a source of energy used to charge the battery.

28. The portable satellite earth station of claim 1, further comprising a battery and a connection to receive an external input not provided by an antenna, wherein when receiving the external input, receiver circuitry within the portable satellite earth station is powered down.

29. The portable satellite earth station of claim 28, wherein the external input is an audio or a video signal.

30. The portable satellite earth station of claim 1, wherein when the housing is closed, the portable satellite earth station enters a low power mode.

31. The portable satellite earth station of claim 1, further comprising storage to store media content and further comprising a port to allow for synchronization of a portable media player stored media content.

32. A housing for use with a receiver/display configured to fit into the housing, the receiver/display including a video display portion hingably connected to a receiver portion and movable between a folded and an unfolded position, the housing comprising:
- a base including a compartment therein to accommodate the receiver/display;
- a hinge;
- an antenna containing portion having a first axis of rotation and a second axis of rotation different than the first axis of rotation, the antenna containing portion coupled to the base via the hinge at the first axis of rotation; and
- a pivot, wherein the antenna containing portion is coupled to the base via the pivot at the second axis of rotation, wherein the pivot rotates the hinge about a center of the hinge, the center of the hinge defined by a point along the first axis of the hinge between a first end and a second end of the hinge, wherein the first axis and second axis intersect and wherein the antenna containing portion is independently rotatable about either of the first axis or the second axis.

33. The housing of claim 32, wherein the antenna containing portion includes an electrically responsive area that is covered by an electromagnetically transparent material.

34. The housing of claim 33, wherein the electromagnetically transparent material comprises a visual message.

35. The housing of claim 34, wherein the visual message comprises an advertisement.

36. The housing of claim 32, further comprising a carrying handle integrated into the housing.

37. The housing of claim 32, wherein the housing further includes a compass for rotational and elevational positioning of the antenna, wherein the compass includes elevational indication.

38. The housing of claim 37, wherein the compass is located on an external portion of the antenna containing portion.

39. The housing of claim 37, wherein the housing further includes an area proximate the compass to accommodate antenna positioning markings by a user.

40. The housing of claim 32, wherein an antenna within the antenna containing portion comprises a self-pointing antenna to facilitate alignment to receive a satellite signal.

41. The housing of claim 40, wherein the self-pointing antenna comprises a motor.

42. The housing of claim 40, wherein the self-pointing antenna comprises a beam steering antenna array.

43. The housing of claim 40, wherein the self-pointing antenna includes acceleration detectors to determine how the antenna has moved from alignment.

44. A portable satellite earth station to facilitate reception of satellite signals and to display audio and video corresponding to the satellite signals:
- a housing including a base hingably connected to an antenna containing portion about a first hinge and pivotably connected to the antenna containing portion about a pivot, the antenna containing portion have a first face and a second face, wherein the first face of the antenna containing portion is directed toward a center of the station in a first position and the second face of the antenna containing portion is directed toward the center of the station in a second position when the antenna containing portion is rotated about the pivot, wherein the base includes a compartment; and
- a receiver/display removably disposed within the compartment in the housing, the receiver/display including a video display portion hingably connected to a receiver portion and movable between a folded position and an unfolded position, wherein the receiver/display may be moved to the unfolded position when the receiver/display is located in the compartment in the housing and the antenna containing portion can be closed into contact with the base over the receiver/display when the receiver/display is in the folded position, wherein a second hinge connecting the video display portion to the receiver portion is opposed to the first hinge connecting the base to the antenna containing portion.

45. The portable satellite earth station of claim 1, wherein the antenna containing portion is rotatable with respect to the base about a first axis and is pivotable with respect to the base about a second axis, the first axis and the second axis intersect substantially orthogonally.

46. A housing for use with a receiver/display configured to fit into the housing, the receiver/display including a video display portion hingably connected to a receiver portion and movable between a folded and an unfolded position, the housing comprising:
- a base including a compartment therein to accommodate the receiver/display;
- a hinge;
- an antenna containing portion having a first axis of rotation and a second axis of rotation different than the first axis of rotation, the antenna containing portion coupled to the base via the hinge at the first axis of rotation; and
- a pivot, wherein the antenna containing portion is coupled to the base via the pivot at the second axis of rotation, wherein the pivot rotates the hinge about a center of the hinge, the center of the hinge defined by a point along the first axis of the hinge between a first end and a second end of the hinge, wherein the hinge is to enable a change in an angle of the antenna containing portion with respect to a plane of the base and the pivot is to rotate the antenna containing portion about the pivot while maintaining the angle of the antenna containing portion with respect to the plane of the base substantially constant.

* * * * *